July 22, 1969    M. DODSON ETAL    3,456,672
AUTOMATICALLY DISCHARGING CONDENSATE TRAP
Filed April 27, 1967

MICHAEL DODSON
JERROLD H. RANDALL
INVENTORS

BY *Thomas L. Peterson*

ATTORNEY

United States Patent Office 3,456,672
Patented July 22, 1969

3,456,672
AUTOMATICALLY DISCHARGING CONDENSATE TRAP
Michael Dodson, Fullerton, and Jerrold H. Randall, Corona Del Mar, Calif., assignors to Beckman Instruments, Inc., a corporation of California
Filed Apr. 27, 1967, Ser. No. 634,215
Int. Cl. F16t 1/20
U.S. Cl. 137—193                                       1 Claim

ABSTRACT OF THE DISCLOSURE

An apparatus for separating liquid condensate from a gas train and for automatically discharging the condensate. The apparatus is particularly suitable for use in an analytical system wherein it is required to remove condensate resulting from a combustion process so that a condensate-free gas stream will be delivered to an analytical instrument in the system.

---

Figure 1:
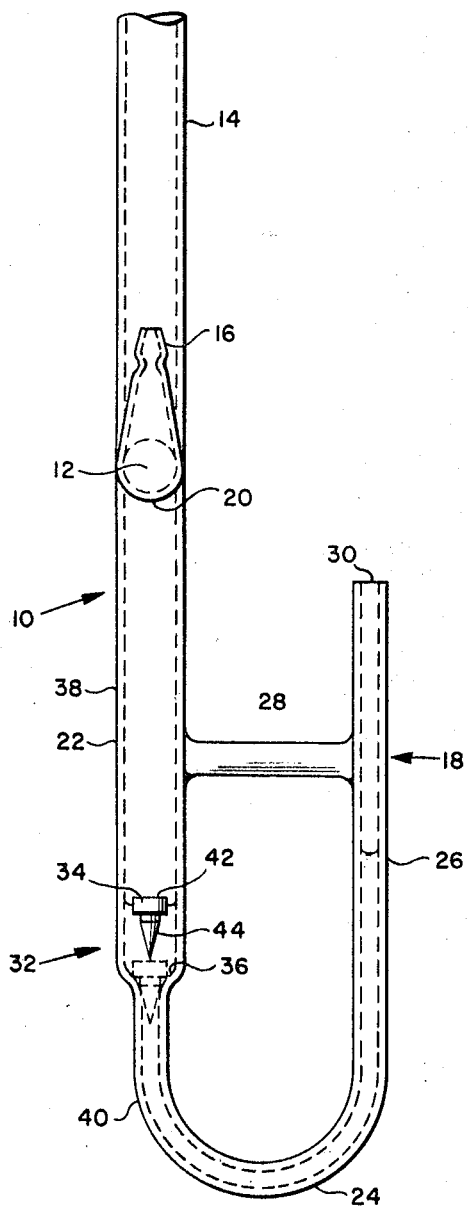

The present invention relates to a condensate trap and, more particularly, to a condensate trap with means for automatically discharging condensate therefrom.

While the apparatus of the present invention may be employed for automatically discharging condensate from any type of gas train, it is particularly suited for integration into a gas train which is a part of an analytical system such as described in U.S. Patent No. 3,296,435 to Teal et al. The Teal et al. application discloses a system for analyzing carbon in aqueous solutions. The gas train of this system comprises a source of oxygen, a combustion tube, a condenser, a trap for condensate from the condenser and an infrared analyzer for measuring $CO_2$. The combustion tube has means at one end for injecting a small quantity of aqueous solution containing carbon and means for passing a continuous stream of oxygen from the source through the tube. A diffusion plug is positioned in the combustion tube to provide ample opportunity for the carbonaceous matter to contact oxygen in the tube to promote the complete oxidation of carbon. Carbon dioxide and water vapor formed in the combustion tube are swept from the tube through the condenser where the vapor is separated from the $CO_2$. The condensate formed in the condenser is removed in a condensate trap while the $CO_2$ passes to the infrared analyzer. The $CO_2$ content of the gas stream provides a measure of the carbon content of the aqueous sample.

United States Patent No. 3,196,893 to Stenger et al. discloses an automatically discharging condensate trap which is particularly suited for use in the aforementioned carbon analysis system. The Stenger et al. condensate trap comprises a U-shaped tubular vessel the lower portion of which provides a condensate trap. The trap communicates with a capillary passage in a discharge conduit which is also U-shaped with the discharge end rising to an elevation above the condensate trap. The level of the capillary discharge end above the condensate level in the trap is equal to the height that condensate will rise in the capillary passage by capillary action plus a static liquid condensate head which is equal to the steady state gas pressure maintained within the trap by the gas passing through the aforementioned carbon analyzer gas train. It is purported that during the operation of such condensate trap, a rise in the level of accumulated liquid condensate in the trap above a predetermined level results in automatic discharge of the condensate from the trap at a rate which increases until it is equal to the rate of condensate accumulation.

Experience has shown, however, that the Stenger et al. condensate trap functions satisfactorily only when certain conditions of the analytical system are met but fails to satisfactorily operate under two other conditions. More specifically, when the carbon analyzer system of Teal et al. is first utilized, the diffusion plug positioned in the combustion tube is loosely packed. Under this condition, the high pressure waves resulting from the combustion process in the combustion tube travel through the loosely packed diffusion plug to the trap causing it to become completely emptied of condensate. The complete removal of condensate from the trap causes the condensate seal in the trap to be broken thus permitting sample gas to escape to the atmosphere. Thus, under this condition the Stenger et al. condensate trap is unsatisfactory. However, after continued use of the analyzer the diffusion plug within the combustion tube becomes more tightly packed so that less of the pressure waves resulting from combustion in the tube are allowed to travel into the condensate trap. When this occurs, less water is removed and the system tends to stabilize so that condensate is removed just as rapidly as it is formed in the manner described in the Stenger et al. patent. However, after a period of time the continued packing of the diffusion plug in the combustion tube results in less of the water being automatically removed from the trap since the pressure waves from the combustion tube as well as the capillary action of the trap are inadequate to remove all of the water collected therein. Since the capillary discharge end is above the condensate trap, the trap fills up with water so that the gas stream passing through the trap carries the excess water into the infrared analyzer. Water in the analyzer causes failure of the system and expensive and time-consuming maintenance.

It is, therefore, the principal object of the present invention to provide an improved automatically discharging condensate trap.

According to the principal object of the present invention, there is provided an apparatus for separating liquid condensate automatically from a gas train. The apparatus comprises a vessel having inlet and outlet ports through which the gas passes and a discharge conduit connected to the lower portion of the vessel. The discharge conduit has a first portion extending downwardly from the vessel and a second portion extending upwardly with a discharge end. Valve means is provided in the downwardly extending portion of the conduit which is operable to close the conduit when the level of liquid condensate in the discharge conduit is below a predetermined level as would result from a high pressure wave in the gas stream passing through the trap. The valve, therefore, seals the discharge conduit under such condition so that at no time will the gas stream escape from the discharge conduit of the apparatus. In addition, the discharge end of the discharge conduit extends above such predetermined level. The valve means in the discharge conduit is operable to open when the level of liquid condensate in the upwardly extending portion of the discharge conduit is above such predetermined level so that the conduit will remain open after high pressure waves in the gas stream have dissipated. Thus, under such condition the valve is open so that pressure waves in the gas stream can automatically force collected condensate from the trap out through the discharge end of the discharge conduit.

Figure 2:
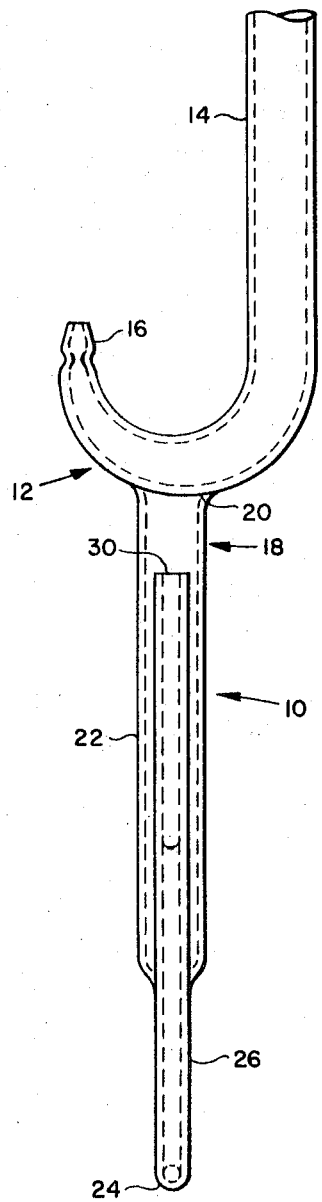

Other objects, aspects and advantages of the invention will become apparent from the following description taken in connection with the accompanying drawings wherein:

FIG. 1 is a front elevation of the automatically discharging condensate trap of the invention; and FIG. 2 is a side elevation thereof.

Referring now to the drawing in detail, wherein like reference characters designate like parts in the two views, the apparatus of the invention is generally referred to by numeral 10. The apparatus comprises a generally U-shaped vessel 12 having at its upper portion an inlet conduit or port 14 and an outlet conduit or port 16. The conduit 14 is adapted to be connected, for example, to the outlet of the combustion tube of the carbon analysis system disclosed in Teal et al. and serves to promote condensation of water in the gas stream passing through the conduit. The condensed water is collected in the trap 12 and the gas stream free of condensate flows out of the apparatus 10 through the port 16 to the infrared analyzer for measuring the $CO_2$ content thereof.

A generally U-shaped discharge conduit, generally referred to by numeral 18, is connected to the lower portion 20 of the condensate trap 12. The discharge conduit 18 comprises a downwardly extending portion 22, a curved lower portion 24 and an upwardly extending portion 26. A brace 28 rigidly connects the portions 22 and 26 of the discharge conduit 18.

As explained previously in connection with the Stenger et al. condensate trap, water vapor in the gas stream passing through the apparatus condenses and collects in the vessel 12 and the discharge conduit 18. The water in the discharge conduit 18 provides a seal for the condensate trap so that the gas stream passing through the system will not escape to atmosphere via the discharge end 30 of the conduit 18. In the prior system, a high pressure wave of gas from the combustion tube of the analytical system may sometimes cause the condensate in the trap to be expelled from the apparatus permitting the escape of the gas stream to atmosphere. Also, when the gas pressure was inadequate, the condensate oftentimes filled up the vessel 12 resulting in water being carried by the gas stream into the infrared analyzer. In accordance with an important feature of the present invention, there is provided a valve, generally referred to by numeral 32, in the downwardly extending portion 22 of the discharge conduit 18 to regulate the water seal in the trap. The valve 32 comprises a floatable valve element 34 which is adapted to be seated on an annular valve seat 36 formed between an upper section 38 of the downwardly extending portion 22 of the discharge conduit and a lower section 40 of smaller cross-sectional area.

The valve element 34, as shown in FIG. 1, is preferably a free-floating element which has a density less than that of the condensate being collected by the trap. The element has an upper, generally cylindrical portion 42 and a lower, conically-shaped portion 44 with its point adjacent to the valve seat 36 serving to guide the valve element into the guide seat. The cross-sectional area of the inlet conduit 14 and vessel 12 is essentially the same as that of the upper portion 38 of the discharge conduit so as to permit the valve element 34 to be assembled in the trap by insertion through the inlet conduit 14 whereby it will drop by gravity through the conduit, the vessel 12, onto the valve seat 36.

In operation of the apparatus, if the level of condensate in the trap falls below a predetermined level which is substantially at the level of the valve seat 36, which would occur when a high pressure wave is received from the combustion tube of the carbon analyzer, the valve element 34 will fall downwardly by gravity and the static force of the gas stream seat upon the valve seat 36, as shown in phantom lines in FIG. 1, thereby sealing the discharge conduit 18 and preventing the sample gas from escaping to atmosphere.

Under normal operating conditions of the carbon analyzing system, wherein the gas pressure throughout the system is under substantially steady state pressure, it is necessary that the valve 32 be open which requires that the element 34 be positioned above the valve seat 36 as shown in full lines in FIG. 1. The valve element 34 is retained in such position by extending the upwardly extending portion 26 of the discharge conduit 18 sufficiently above the level of the valve seat 36 so that the hydraulic head in conduit portion 26 will be sufficient to overcome the effect of the static force of the gas stream on the valve element 34 whereby the valve element will be permitted to float in the condensate above the seat 36. The discharge end 30 of the discharge conduit 18 terminates below the lower portion 20 of the vessel 12 to prevent the vessel 12 from completely filling with water in the event of negligible pressure increases in the gas train and also to permit the condensate to discharge from the trap under the effect of the hydraulic head of the condensate in the vessel 12 and downwardly extending portion 22 of the discharge conduit 18 together with the static force of the gas stream in the gas train.

An apparatus as disclosed herein formed of glass, except with the valve element 34 formed of polypropylene, has been constructed and successfully tested in a carbon analyzer of the type described in Teal et al. under the three conditions described hereinabove, namely under steady state pressure conditions, under high pressure conditions as occur when the diffusion plug in a combustion tube is only loosely packed, and under conditions when such diffusion plug is tightly packed wherein the condensate escapes from the discharge end 30 of the apparatus due to the effect of the pressure head of the condensate in the portion 22 of the conduit 18.

While the valve element 34 has been illustrated as having a cylindrical upper portion and a conical lower portion, it is appreciated that it may take the form of a sphere or any other convenient form so long as the density is less than that of the condensate. Also, the valve element 34 could be in the form of a flap, rather than a free-floating element, if it meets the aforementioned density requirements.

Although only one embodiment of the invention has been disclosed herein for purposes of illustration, it will be understood that various changes can be made in the form, details, arrangement and proportions of the various parts in such embodiment without departing from the spirit and scope of the invention as defined by the appended claim.

I claim:

1. An apparatus for separating liquid condensate from a gas train comprising:

an integral container including a vessel portion and a discharge conduit adapted to hold liquid condensate;

said vessel portion being formed with inlet and outlet ports in its upper part for connection into a gas train;

said discharge conduit having a generally U-shaped configuration and including a first tubular leg extending downwardly from the lower part of said vessel portion and a second upwardly extending tubular leg terminating in a discharge end;

said first leg being composed of upper and lower sections, said lower section having a diameter less than that of said upper section providing therebetween an annular upwardly facing shoulder;

a free floating valve element in said upper section of said first leg adapted to seat upon said shoulder, said valve element having a density less than that of said condensate;

one of said ports of said vessel portion and said upper leg having a cross-section sufficiently large so as to allow free movement of said valve element therethrough; and said discharge end of said second leg terminating below said lower part of said vessel portion and above said shoulder a distance sufficiently great so that the hydraulic head of condensate in the second leg is sufficient to overcome the normal static force of gas in the gas train on the valve element and the hydraulic head of condensate in the first leg.

References Cited

UNITED STATES PATENTS

| 545,550 | 9/1895 | Symons | 137—179 X |
| 2,487,073 | 11/1949 | Schroeder | 137—193 |
| 2,522,220 | 9/1950 | Glick | 137—192 X |
| 2,691,385 | 10/1954 | Budd | 137—399 |
| 3,196,893 | 7/1965 | Stenger | 137—204 |

FOREIGN PATENTS 697,551  11/1930  France.

ALAN COHAN, Primary Examiner